Patented May 10, 1932

1,857,571

UNITED STATES PATENT OFFICE

ROBERT L. SEBASTIAN, OF MONTCLAIR, NEW JERSEY, ASSIGNOR TO THE AMERICAN AGRICULTURAL CHEMICAL COMPANY, A CORPORATION OF DELAWARE

PROCESS FOR REACTING ACID PHOSPHATES WITH AMMONIA LIQUOR

No Drawing. Application filed August 26, 1930. Serial No. 477,988.

This invention relates to the neutralization of materials containing acid phosphates with ammonia liquor. While the invention is applicable to the reaction of acid metal phosphates, its preferred application is to the treatment with ammonia liquor of calcium acid phosphates and the invention will therefore be illustrated in application to this material.

The calcium acid phosphates may be produced either by the treatment of calcium tri-phosphate with sulphuric acid in quantity less than is required for the manufacture of orthophosphoric acid, or may be alternatively produced by adding free phosphoric acid to calcium tri-phosphate. Quantities of calcium acid phosphates are produced in this manner directly from rock containing calcium tri-phosphate, such as apatite. Methods for the generation of calcium acid phosphate are well known in the art and form no part of this invention.

The term "acid phosphates" as herein employed, will denote both the mono and dibasic acid phosphates.

For the purpose of generating a fertilizer material containing both nitrogen and available phosphoric acid, the calcium acid phosphate may be reacted with ammonia liquor thereby forming a calcium ammonium phosphate. An ammonia liquor which has not been freed of hydrogen sulphide is preferable for this purpose by reason of its lower cost, but is objectionable in use both to the operator and to persons in the vicinity of the plant for the reason that hydrogen sulphide is evolved when the ammonia liquor is admixed with the material containing the calcium acid phosphate. I have found that this evolution of hydrogen sulphide may be substantially eliminated by the addition of sulphur dioxide in controlled proportions to at least one of the reacting materials. If the sulphur dioxide were added to the calcium acid phosphate material it would necessarily be employed in the form of sulphurous acid, and for this reason the preferred practice consists in adding the correct proportion of sulphur dioxide directly to the ammonia liquor at or before the addition of the ammonia liquor to the calcium acid phosphate material.

While it is well known that sulphur dioxide reacts with hydrogen sulphide in water solutions to produce sulphur, the reaction will not result in the elimination of the major part of the hydrogen sulphide in alkaline solution. Therefore, I treat the ammonia liquor with sulphur dioxide and then take advantage of the acid character of the superphosphate to bring about the desired reaction.

I have found that the theoretical amounts of one molecule of sulphur dioxide for each two molecules of hydrogen sulphide is not sufficient to completely eliminate the hydrogen sulphide.

I have further found that for optimum results the sulphur dioxide should be added in the proportion of two mols of sulphur dioxide for each mol of hydrogen sulphide present. If this proportion is exceeded, sulphur dioxide may be evolved when the ammonia liquor is added to the calcium acid phosphate; and while less objectionable than hydrogen sulphide, the evolution of sulphur dioxide should be avoided. The addition of the sulphur dioxide to the ammonia liquor does not automatically eliminate or kill the hydrogen sulphide. The actual conversion of the hydrogen sulphide to forms which are not objectionable appears to take place when the ammonia liquor reacts with the calcium acid phosphate material and as a consequence of the interaction of the ammonia with the phosphate material.

The foregoing description is for purposes of illustration and not of limitation, and it is therefore my intention that the invention be limited only by the appended claims or their equivalents in which I have endeavored to claim broadly all inherent novelty.

I claim:

1. Process of neutralizing material containing acid phosphate, which comprises adding sulphur dioxide to ammonia liquor containing hydrogen sulphide, and admixing the resultant liquor with material containing acid phosphate, thereby inhibiting the evolution of hydrogen sulphide.

2. Process of neutralizing material containing acid phosphate, which comprises adding sulphur dioxide to ammonia liquor containing hydrogen sulphide, the added sulphur dioxide being approximately in the proportion of 2 mols of sulphur dioxide for each mol of hydrogen sulphide, and admixing the resultant liquor with material containing acid phosphate, thereby inhibiting the evolution of hydrogen sulphide.

3. Process of neutralizing material containing calcium acid phosphate, which comprises adding sulphur dioxide to ammonia liquor containing hydrogen sulphide, and admixing the resultant liquor with material containing calcium acid phosphate, thereby inhibiting the evolution of hydrogen sulphide.

4. Process of neutralizing material containing calcium acid phosphate, which comprises adding sulphur dioxide to ammonia liquor containing hydrogen sulphide, the added sulphur dioxide being approximately in the proportion of 2 mols of sulphur dioxide for each mol of hydrogen sulphide, and admixing the resultant liquor with material containing calcium acid phosphate, thereby inhibiting the evolution of hydrogen sulphide.

ROBERT L. SEBASTIAN.